United States Patent
White

(10) Patent No.: US 6,180,008 B1
(45) Date of Patent: Jan. 30, 2001

(54) POLYIMIDE MEMBRANES FOR HYPERFILTRATION RECOVERY OF AROMATIC SOLVENTS

(75) Inventor: Lloyd Steven White, Columbia, MD (US)

(73) Assignee: W. R. Grace & Co.-Conn., New York, NY (US)

(*) Notice: Under 35 U.S.C. 154(b), the term of this patent shall be extended for 0 days.

(21) Appl. No.: 09/126,261

(22) Filed: Jul. 30, 1998

(51) Int. Cl.[7] .................................................. B01D 29/00
(52) U.S. Cl. ........................... 210/500.39; 210/500.27; 210/490; 264/41; 264/48; 264/49; 208/308
(58) Field of Search .................... 210/500.39, 500.27, 210/500.23, 652, 490; 264/41, 48, 49, 298; 208/308; 96/12, 14

(56) References Cited

U.S. PATENT DOCUMENTS

| | | |
|---|---|---|
| 2,930,754 | 3/1960 | Stuckey . |
| 2,958,656 | 11/1960 | Stuckey . |
| 3,179,632 | 4/1965 | Hendrix . |
| 3,179,633 | 4/1965 | Endrey . |
| 3,370,102 | 2/1968 | Carpenter et al. . |
| 3,546,175 | 12/1970 | Angelo . |
| 3,708,458 | 1/1973 | Alberino et al. . |
| 3,789,079 | 1/1974 | Perry et al. . |
| 3,816,303 | 6/1974 | Wrasidlo . |
| 3,822,202 | 7/1974 | Hoehn et al. . |
| 3,853,754 | 12/1974 | Gosser . |
| 3,856,752 | 12/1974 | Bateman et al. . |
| 3,925,211 | 12/1975 | Schumann et al. . |
| 4,113,628 | 9/1978 | Alegranti . |
| 4,115,465 | 9/1978 | Elfert et al. . |
| 4,240,914 | 12/1980 | Iwama et al. . |
| 4,307,135 | 12/1981 | Fox . |
| 4,378,324 | 3/1983 | Makino et al. . |
| 4,432,866 | 2/1984 | West et al. . |
| 4,440,643 | 4/1984 | Makino et al. . |
| 4,470,944 | 9/1984 | Asakura et al. . |
| 4,474,662 | 10/1984 | Makino et al. . |
| 4,485,056 | 11/1984 | Makino et al. . |
| 4,486,376 | 12/1984 | Makino et al. . |
| 4,512,893 | 4/1985 | Makino et al. . |
| 4,532,029 | 7/1985 | Black et al. . |
| 4,532,041 | 7/1985 | Shuey et al. . |
| 4,746,474 | 5/1988 | Kohn . |
| 4,751,444 | 6/1988 | Orlarey . |
| 4,836,927 | 6/1989 | Wan . |
| 4,902,422 | 2/1990 | Pinnau et al. . |
| 4,908,134 | 3/1990 | Anderson . |
| 4,921,611 | 5/1990 | Schucker . |
| 4,925,566 | 5/1990 | Bardot et at. . |
| 4,929,358 | 5/1990 | Koenitzer . |
| 4,929,405 | 5/1990 | Kohn . |
| 4,933,083 | 6/1990 | Jones, Jr. . |
| 4,933,085 | * 6/1990 | Kneifel et al. ................... 210/500.39 |
| 4,963,303 | 10/1990 | Anderson . |
| 5,067,970 | 11/1991 | Wang et al. . |
| 5,085,676 | 2/1992 | Ekiner et al. . |
| 5,133,867 | 7/1992 | LaFreniere . |
| 5,264,166 | 11/1993 | White et al. . |
| 5,429,748 | 7/1995 | White et al. . |
| 5,605,627 | 2/1997 | Carlsen et al. . |
| 5,651,877 | 7/1997 | Gould et al. . |
| 5,725,769 | 3/1998 | Miller et al. . |

OTHER PUBLICATIONS

*Hanley's Condensed Chemical Dictionary*, Richard J. Lewis, Sr. Twelth Edition*

* cited by examiner

*Primary Examiner*—Ana Fortuna
(74) *Attorney, Agent, or Firm*—Robert Maggio; Beverly J. Antale

(57) ABSTRACT

Improved asymmetric hyperfiltration membranes and their method of preparation and use are disclosed. The membranes are fashioned from polyimides and conditioned with a lubricating oil. Permselective separation of aromatic hydrocarbons from non-aromatic hydrocarbons in a feed stream may be accomplished using the membranes under hyperfiltration conditions.

32 Claims, No Drawings

POLYIMIDE MEMBRANES FOR HYPERFILTRATION RECOVERY OF AROMATIC SOLVENTS

FIELD OF THE INVENTION

The present invention relates to improved asymmetric membranes fashioned from a polyimide and the method of preparing the membranes. The invention also relates to the method of using the membranes for the separation of aromatic hydrocarbons from non-aromatic hydrocarbons under hyperfiltration conditions.

Of particular interest, the membranes are useful for the recovery of aromatic hydrocarbons, i.e. toluene, having a high purity from process streams containing aromatic and non-aromatic hydrocarbons during a commercial process for the production of aromatic hydrocarbons.

BACKGROUND OF THE INVENTION

The separation of aromatics from non-aromatics is useful in upgrading aromatics containing streams in petroleum refineries, such streams including, naphtha streams, heavy catalytic naphtha streams, intermediate catalytic naphtha streams, light aromatic streams and reformate streams, and in chemical operations for the recovery of aromatics such as benzene, toluene, xylenes, naphthalene, etc.

The use of membranes to separate aromatics from saturates has long been pursued by the scientific and industrial community. Methods of membrane separation include hyperfiltration (also known as reverse osmosis in aqueous separations), pervaporation and perstraction. Pervaporation relies on vacuum on the permeate side to evaporate the permeate from the surface of the membrane and maintain the concentration gradient driving force which drives the separation process. In perstraction, the permeate molecules in the feed diffuse into the membrane film, migrate through the film and reemerge on the permeate side under the influence of a concentration gradient. A sweep flow of liquid or gas is used on the permeate side of the membrane to maintain the concentration gradient driving force. In contrast, hyperfiltration does not require the use of external forces on the permeate side of the membrane, but drives the separation through application of a pressure gradient.

Membrane separation of aromatics from saturates has been the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e., aromatic, unsaturated, saturated, by permeating a portion of the mixture through a non-porous cellulose ether membrane and removing permeate from the permeate side of the membrane using a sweep gas or liquid. Feeds include hydrocarbon mixtures, naphtha (including virgin naphtha, naphtha from thermal or catalytic cracking, etc.).

U.S. Pat. No. 2,930,754 teaches a method for separating hydrocarbons e.g., aromatic and/or olefins from gasoline boiling range mixtures, by the selective permeation of the aromatic through certain cellulose ester non-porous membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation.

U.S. Pat. No. 4,929,358 teaches the use of polyurethane membranes for the separation of aromatics from non-aromatics. Permeation is conducted under pervaporation, perstraction, reverse osmosis, or dialysis conditions. None of the experimental results reported in this patent were obtained under reverse osmosis conditions.

Polyimide membranes have been used for the separation of aromatics. U.S. Pat. No. 4,571,444 teaches the separation of alkylaromatics from aromatic solvents using a polyimide polymer membrane. The polyimide membrane of choice was an asymmetric polyimide polymer membrane prepared from a fully imidized, highly aromatic polyimide copolymer. Permeation was performed under reverse osmosis conditions.

U.S. Pat. No. 4,532,029 discloses the use of an asymmetric polyimide membrane for the separation of aromatics from lower aromatic middle distillate feeds. Permeation of the feeds in the presence of a light polar solvent, e.g., acetonitrile, was required to obtain permeates having a high aromatic content, i.e., greater than 86%.

The majority of investigations for aromatic/non-aromatic separations have heretoafore involved pervaporation or perstraction separation techniques. This is probably due to reports of prior literature that very high operational pressures are required in hyperfiltration to reach a equivalent performance achievable by pervaporation and perstraction processes. Unfortunately, pervaporation and perstraction separation systems are higher cost than a hyperfiltration system due to expenses associated with vacuum, refrigeration and heat transfer systems.

Consequently, it is an advantage of this invention to provide improved asymmetric polyimide membranes for the separation of aromatic hydrocarbons from non-aromatic hydrocarbons in a feed stream by hyperfiltration. It is also an advantage of this invention to provide a method of preparing the membrane by a phase inversion technique, which method permits variations in processing conditions to optimize the selective permeation of aromatic hydrocarbons through the membranes in the presence of non-aromatic hydrocarbons.

Another advantage of the invention is to provide a membrane useful in a process of separating aromatic hydrocarbons as described in copending application Ser. No. 125,256, entitled "Recovery of Aromatic Hydrocarbons Using Lubricating Oil1-Conditioned Membranes", Mobil filed on even date herewith.

Other facets and advantages of the present invention will be apparent from the ensuing description and the appended claims.

SUMMARY OF THE INVENTION

Improved asymmetric membranes which have high selectivity to permeate aromatic hydrocarbons in the presence of non-aromatic hydrocarbons under hyperfiltration conditions have been found. The membranes are prepared from a polyimide by a phase inversion technique and are thereafter treated with a lubricating oil to condition the membranes. Membranes in accordance with the invention exhibit over 30% rejection of the non-aromatic hydrocarbon materials at a commercially adequate flow rate in a temperature range of about −20 to 150° C.

Using the membranes of the invention, permselective separation of aromatic hydrocarbons from non-aromatic hydrocarbons in a feed stream may be accomplished by hyperfiltration with sufficient flux and selectivity to offer improved economics over pervaporation conditions. However, it is not intended to limit the use of the membranes to hyperfiltration mode of operation.

A process for using the membrane of the present invention is disclosed in co-pending application Ser. No. 126,256, entitled "Recovery of Aromatic Hydrocarbons Using Lubricating Oil Conditioned Membranes", filed on even date herewith.

DETAILED DESCRIPTION OF THE INVENTION

The term "aromatic hydrocarbon" is used herein to designate a hydrocarbon-based organic compound containing one or more aromatic rings. An aromatic ring is typified by benzene having a single aromatic nucleus. Aromatic compounds having more than one aromatic ring include, for example, naphthalene, anthracene, etc. Preferred aromatic hydrocarbons useful in the present invention include those having 1 to 2 aromatic rings.

The term "non-aromatic hydrocarbon" is used herein to designate a hydrocarbon-based organic compound having no aromatic nucleus.

For purposes of this invention, the term "hydrocarbon-based organic compound" is used to mean an organic compound having a predominately hydrocarbon character. It is contemplated within the scope of this definition that a hydrocarbon compound may contain at least one non-hydrocarbon radical (e.g., sulfur or oxygen) provided that said non-hydrocarbon radicals do not alter the predominant hydrocarbon nature of the organic compound and/or do not react to alter the chemical nature of the polyimide of the membrane within the context of the present invention.

Asymmetric membranes are defined for purposes of this invention as an entity composed of a dense ultra-thin top "skin" layer over a thicker porous substructure of the same or different material. Typically, the asymmetric membrane is supported on a suitable porous backing or support material.

Polyimide membranes of the invention can be produced from a number of polyimide polymer sources. The identity of such polymers are presented in numerous patents. See, for example, U.S. Pat. No. 4,307,135, U.S. Pat. No. 3,708,458, U.S. Pat. No. 3,789,079, U.S. Pat. No. 3,546,175, U.S. Pat. No. 3,179,632, U.S. Pat. No. 3,179,633, U.S. Pat. No. 3,925,211, U.S. Pat. No. 4,113,628, U.S. Pat. No. 3,816,303, U.S. Pat. No. 4,240,914, U.S. Pat. No. 3,822,202, U.S. Pat. No. 3,853,754 and British Patent No. 1,434,629.

A preferred polyimide polymer useful to prepare the membranes of the invention is available as Matrimid 5218 from Ciba Geigy. The structure of the polyimide, Matrimid, is shown below. The polyimide is also known as the polymer with 1 (or 3)-(4-aminophenyl)-2,3-dihydro-1,3,3 (or 1,1,3)-trimethyl-1H-inden-5-amine and 5,5'-carbonylbis-1,3-isobenzofurandione (CAS Number 62929-02-6). A common name for Matrimid is the polymer with diaminophenylindane and benzophenone tetracarboxylic dianhydride.

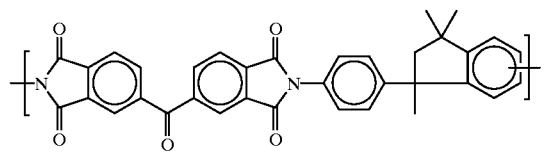

Matrimid 5218

Most preferably, the membranes of the invention are prepared from a polyimide polymer described in U.S. Pat. No. 3,708,458, assigned to Upjohn. The polymer, available from HP Polymers, Inc, Lewisville, Tex. as Lenzing P84, is a copolymer derived from the co-condensation of benzophenone 3,3',4,4'-tetracarboxylic acid dianhydride (BTDA) and a mixture of di(4-aminophenyl) methane and toluene diamine or the corresponding diisocyanates, 4,4'-methylenebis(phenyl isocyanate) and toluene diisocyanate.

The obtained copolyimide has imide linkages which may be represented by the structural formulae:

I

AND

II

Lenzing P84 wherein the copolymer comprises from about 10 to 90% I and 90 to 10% II, preferably about 20% I and about 80% II.

Another polyimide useful to prepare a membrane in accordance with the invention is a polymer, available from HP Polymers, Inc., Lewisville, Tex. as Lenzing P84 HT. The polymer is the co-condensation of 1H,3H-Benzo[1,2-c:4,5-c']difuran-1,3,5,7-tetrone with 5,5'-carbonyl[bis1,3-isobenzofurandione], 1,3-diisocyanato-2-methylbenzene and 2,4-diisocyanato-1-methylbenzene. The structure of the polyimide is shown below.

AND

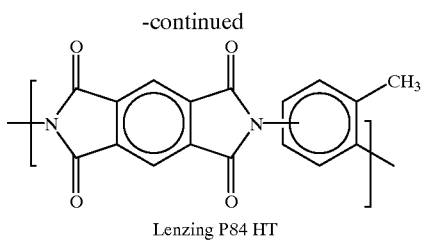

Lenzing P84 HT

Membranes in accordance with the invention can be made by dissolving the desired polyimide polymer in a solvent to give a viscous, polymer dope solution, spreading the solution upon a porous support to form a film, partially evaporating the solvent, and quenching the film in water. This precipitates the polymer and forms an asymmetric membrane by the phase inversion process.

The polyimide polymer dope solution is prepared by dissolving the polyimide polymer in one or a mixture of the following water-miscible solvents: N-methyl-2-pyrrolidone, hereinafter referred to as NMP, tetrahydrofuran, hereinafter referred to as THF, N,N-dimethylformamide, hereinafter referred to as DMF, dioxane, γ-butyrolactone, water, alcohols, ketones, and formamide.

The weight percent of the polyimide polymer in solution may range from 12% to 30% in the broadest sense, although a 18% to 28% range is preferable and a 20% to 26% range will produce the best results.

Additives such as viscosity enhancers may be present in amounts up to 10% by weight of the said polyimide polymer dope solution and these include polyvinyl pyrrolidones, polyethylene glycols and urethanes. Additionally additives such as void suppressors may be used in amounts up to 5% of the weight of said polyimide polymer dope solution, and in this case maleic acid produces the desired results.

Once the polyimide polymer is dissolved in the solvent system described, it is cast onto a suitable porous support or substrate. The support can take the form of an inert porous material which does not hinder the passage of permeate through the membrane and does not react with the membrane material, the casting solution, the gelation bath solvent, or the aromatic materials being separated. Typical of such inert supports are metal mesh, sintered metal, porous ceramic, sintered glass, paper, porous nondissolved plastic and woven or non-woven material. Preferably, the support material is a non-woven polyester, polyethylene, or polypropylene material.

Following the casting operation, a portion of the solvent may be evaporated under conditions sufficient to produce a dense, ultra-thin, top "skin" layer on the polyimide membrane. Typical evaporation conditions adequate for this purpose include air blown over the membrane surface at 15° to 25° C. for a duration of less than 30 seconds.

The dense ultra-thin top "skin" layer of the asymmetric polyimide membranes of the invention is characterized by pore sizes below 50 Å in diameter, is highly resistant to the greater than 500 psi operating pressures and has high operating efficiency and stability in the presence of solvent streams having a high aromatic content.

The coagulating or quenching medium may consist of water, alcohol, ketones or mixtures thereof, as well as additives such as surfactants, e.g., Triton X-100® available from Aldrich Chemical Company, Milwaukee, Wis. (octylphenoxy-polyethoxyethanol). The conditions for effecting coagulation are conventional.

The asymmetric polyimide membranes of the present invention can be washed and dried according to the following techniques. Typically a water-soluble organic compound such as low molecular weight alcohols and ketones including but not limited to methanol, ethanol, isopropanol, acetone, methylethyl ketone or mixtures thereof and blends with water can be used for removing the residual casting solvent (e.g., NMP) from the membrane. Alternatively the membrane may be washed with water. Removal of the residual casting solvent may require successive wash blends in a sequential solvent exchange process. Both membrane efficiency and flow rate can be enhanced by the proper solvent exchange process.

The membrane is then conditioned by contacting the membrane with a conditioning agent dissolved in a solvent to impregnate the membrane. The conditioning agent is a lubricating oil. Lubricating oils include, for example, synthetic oils (e.g., polyolefinic oils, silicone oils, polyalphaolefinic oils, polyisobutylene oils, synthetic wax isomerate oils, ester oils and alkyl aromatic oils) and mineral oils, including solvent refined oils and hydroprocessed mineral oils and petroleum wax isomerate oils. The lubricating oil may be a light neutral oil having a boiling temperature of 400–450° C. to a heavy lubricating oil having a boiling temperature from 450–500° C. It is also within the scope of the invention to use other natural lubricating oils such as, for example, vegetable fats and oils, however, such fats and oils may be less desirable to avoid introducing unwanted contaminants into the process streams. Suitable solvents for dissolving the conditioning agent includes alcohols, ketones, aromatics, or hydrocarbons, or mixtures thereof.

The use of a conditioning agent in accordance with the invention allows the membrane to maintain a high flux while exhibiting a high selectivity to permeate aromatics in the presence of non-aromatics. The conditioning agent also allows the membrane to be wetted with hydrocarbon solvents, to maintain a suitable pore structure in a dry state for permeation of aromatics, and to produce a flat sheet membrane with improved flexibility and handling characteristics.

Following treatment with the conditioning agent, the membrane is typically dried in air at ambient conditions to remove residual solvent. Preferably the membrane is dried in a forced air drying oven designed to capture solvent emissions.

Heat treatment can also be used to increase membrane rejection of non-aromatic hydrocarbons. After the conditioning step, the membrane may be heated to about 150° C. to about 320° C., preferably about 200° C. for about 1 minute to 2 hours. At about 200° C., the heating time is typically about 5 minutes. It is preferred that the membrane be air dried before heating.

Once the membranes are formed they may be processed into spiral wound modules, into hollow fiber configurations, into flat sheet or into plate and frame configurations.

In the practice of a preferred embodiment of the present invention, a feed stream containing the aromatic hydrocarbons and non-aromatic hydrocarbons to be separated will be contacted with the dense active layer side of the polyimide membrane under pressure and at a temperature sufficient to effect the desired separation. Such contacting will typically be at about −20° C. to about 150° C., preferably about 20° C. to about 80° C. The pressure employed will be at least greater than that sufficient to overcome the osmotic pressure difference between the feed stream and the permeate stream. Preferably there will be at least a net driving force of about 100 to 1000 psi across the membrane, more preferably a net driving force of about 400 to 1000 psi, most preferably about 600 to 800 psi. Preferably, no additional heating or cooling of the stream is made to minimize energy requirements.

The membranes of the invention are preferably used in accordance with the invention as described in co-pending application Ser. No. 126,256 entitled "Recovery of Aromatic Hydrocarbons Using Lubricating Oil Conditioned Membranes", filed on even date herewith. In accordance with the co-pending application, the invention membranes are contacted with a feed stream having at least 10 wt % of aromatic hydrocarbons. In a preferred embodiment, the membranes are contacted with a feed stream containing an aromatic hydrocarbon content of above 50 wt %, most preferably 70 wt % or higher. In one embodiment the feed stream contains an aromatic hydrocarbon content of 80 wt % or higher, preferably 90 wt % or higher.

The membranes of the invention can be used to upgrade aromatics containing streams in petroleum refineries, such streams including, naphtha streams, heavy catalytic naphtha streams, intermediate catalytic naphtha streams, light aromatic streams and reformate streams. The membranes are also useful in commercial chemical operations for the recovery of aromatics such as, for example, benzene, toluene, xylene, and alkyl naphthalene. Of particularly interest, the membranes of invention can have application at various points in a commercial aromatics, i.e. toluene, production unit to upgrade the aromatics content of process streams. It is within the scope of the invention to use the invention membranes alone or in combination with other adsorption, distillation, extraction or reforming processes. When used in a hybrid process with other separation technologies, the invention membrane is not required to make 100% separation of aromatics from non-aromatics, but can instead be used to perform partial separation of aromatics to complement overall separation processes. The membrane of the invention thus offers excellent efficiencies in bulk separation processes which when coupled with other more selective unit operations can offer enhanced performance.

The Examples below are for illustrative purposes only, and do not limit the invention, or the claims which follow them.

EXAMPLES

In the cases shown here, the asymmetric polyimide membranes preferentially permeate aromatic over non-aromatic hydrocarbons. The membranes were tested on a small bench unit with four (4) test cells in series under reverse osmosis conditions The feed solution was continuously flushed over the membrane surfaces, and the permeate and retentate streams were combined and recycled. A typical feed solution consists of a high toluene concentration (80–100%), along with lesser amounts of other aromatic compounds such as benzene and p-xylene and non-aromatic hydrocarbons including branched and unbranched C6 to C9 isomers. The feed was pressurized, heated to operating temperatures, and pumped over the surface of the membrane. If desired, permeate lines could also be pressurized. Permeate samples were generally collected after overnight operation (18+ hours).

Membrane coupons were small disks with 14.2 cm$^2$ surface area. Flows were determined in ml/min and then converted to gallons per square foot per day (GFD). Sample sizes were kept at less than 1% by weight of material, so that retentate and feed compositions were essentially equal. GC analysis was used to identify concentrations of aromatic and non-aromatic compounds. All concentrations were expressed as weight percent. Rejection was calculated from the sum of non-aromatic compounds in both the permeate and retentate streams with the formula Rejection (%)=(1-% per/% ret) 100%. In some cases, specific rejections for a given hydrocarbon were calculated.

Example 1

A viscous solution containing 22% Lenzing P84 polyimide (HP Polymers, Inc., Lewisville, Tex.), 67% dioxane, and 11% dimethylformamide (DMF) was prepared and filtered through a 10 micron filter. This solution was cast at 10 ft/min onto a moving web of nonwoven polyester fabric (Hollytex 3329 from Ahlstrom Filtration, Mt. Holly Springs, Pa.) using a knife blade set at a gap of 7 mil above the fabric. After about 15 seconds with an air flow of 1 SCFM the coated fabric was quenched in water at 22° C. to form the membrane structure. The membrane was washed with water to remove residual solvents. then solvent exchanged by immersion into methyl ethyl ketone (MEK) for 3 hours, followed by immersion in a solution of 20% light neutral lube oil/40% MEK/40% toluene for 3 hours. The membrane was then air dried.

The membranes were tested as flat sheet coupons at 50° C. and 800 psi with various circulating solutions consisting of a high toluene concentration and additional aromatic and non-aromatic C6 to C9 hydrocarbons typically found in a toluene process stream in refinery operations. Total aromatic content in one of the feeds was 99.37 wt %.

The membrane exhibited good rejection (54%) of non-aromatics and a flux of 22.9 GFD. The aromatic content in the permeate was 99.71 wt %.

Example 2

A viscous solution containing 24% Lenzing P84 polyimide (HP Polymers, Inc., Lewisville, Tex.), 56% dioxane, and 20% dimethylformamide (DMF) was prepared. This solution was cast at 4 ft/min onto a moving web of nonwoven polyester fabric (Hollytex 3329 from Ahlstrom Filtration, Mt. Holly Springs, Pa.) using a knife blade set at a gap of 7 mil above the fabric. After about 3 seconds with an air flow of 20 SCFH the coated fabric was quenched in water at 20° C. to form the membrane structure. The membrane was washed with water to remove residual solvents, then solvent exchanged by immersion into methyl ethyl ketone (MEK) for 1 hour, followed by immersion in a second solvent exchange bath of light neutral lube oil in 50/50 MEK/toluene for 1 hour. The membrane was then air dried.

A series of Lenzing P84 membranes with differing oil content were prepared by changing levels of oil in the 2nd exchange bath from 0 to 60% oil, while maintaining a 50/50 ratio of MEK/toluene.

A feed solution consisting of 88 wt % toluene with six compounds (n-decane (C10), 1-methylnaphthalene (C11), n-hexadecane (C 16), 1-phenylundecane (C17), pristane (C19), and n-docosane (C22) each at 2% levels was prepared. Coupons of each membrane were tested at 600 psi and 50° C. Results are recorded in Table 1 below.

TABLE 1

| Oil Content in 2nd Solvent Exchange Bath (%) | Flux (GFD) | C10 Rejection (%) |
| --- | --- | --- |
| 0 | 2.4 | 65 |
| 20 | 25.3 | 45 |
| 33 | 26.3 | 43 |
| 50 | 27.7 | 42 |
| 60 | 27.4 | 42 |

The membrane having no lube oil present as a conditioning agent had an unacceptably low flux. The membranes conditioned with lube oil exhibited over 40% rejection of non-aromatic with a significant increase in flux (GFD) over the unconditioned membrane.

Example 3

A viscous solution containing 26% Matrimid 5218 polyimide (Ciba Geigy, Hawthorne, N.Y.), 15% acetone, and 59% dimethylformamide (DMF) was prepared and filtered through a 10 micron filter. This solution was cast at 10 ft/min onto a moving web of nonwoven polyester fabric (Hollytex 3329 from Ahlstrom Filtration, Mt. Holly Springs, Pa.) using a knife blade set at a gap of 8 mil above the fabric. After about 15 seconds with an air flow of 1 SCFM the coated fabric was quenched in water at 22° C. to form the membrane structure. The membrane was washed with water to remove residual solvents, then solvent exchanged by immersion into methyl ethyl ketone (MEK) for 3 hours, followed by immersion in a solution of 20% light neutral lube oil/40% MEK/40% toluene for 3 hours. The membrane was then air dried.

A feed solution consisting of 94 wt % toluene with three non-aromatic compounds (n-decane, n-hexadecane, and n-docosane) each at 2% levels was prepared. Coupons of each membrane were tested at 600 psi and 50° C.

The membrane demonstrated 25% rejection of n-decane, 51% rejection of n-hexadecane and 68% rejection of n-docosane with a flux of 18.0 GFD.

Example 4

A Lenzing P84 membrane was prepared as in Example 2 and with the second solvent exchange bath containing 33% oil. An annealed membrane was prepared by clipping a sample to a glass plate, and heating in an oven at 220° C. for set times. The samples were tested with a toluene solution under pressure as in Example 2. Results are recorded in Table 2 below.

TABLE 2

Flux and Rejection for Lenzing P84 Membrane at 600 psi and 50° C.

| Anneal Time | Flux | Rejection (%) | | | | | |
|---|---|---|---|---|---|---|---|
| (minutes) | (GFD) | C10 | C11 | C16 | C17 | C19 | C22 |
| 0 | 29.7 | 45 | 0 | 75 | 70 | 83 | 95 |
| 2 | 19.3 | 54 | 0 | 74 | 63 | 81 | 95 |
| 4 | 17.4 | 59 | 16 | 88 | 84 | 97 | 100 |
| 6 | 9.4 | 66 | 27 | 83 | 75 | 88 | 100 |
| 8 | 3.9 | 75 | 34 | 91 | 100 | 100 | 100 |

Rejection of the non-aromatic components by the membrane increased with heat treatment of the membrane.

Example 5

An annealed Lenzing P84 membrane was prepared as in Example 4 by clipping a sample to a glass plate, and heating in an oven at 180° C. for 5 minutes. Coupons of this membrane were tested with a toluene stream obtained from a refinery. The non-aromatics in this sample were isomers of C7 and C8 including methyl heptanes, ethyl hexanes, dimethyl hexanes, methyl ethyl pentanes, trimethyl pentanes, methyl ethyl cyclopentanes, trimethyl cyclopentanes, and dimethyl cyclohexanes. Results are recorded in Table 3 below.

TABLE 3

Rejection and Flux for Lenzing P84 Membrane at 800 psi and 58° C.

| | Benzene (%) | Toluene (%) | p-Xylene (%) | % Non-Aromatics | Flux (GFD) | Non-Aromatics Rejection (%) |
|---|---|---|---|---|---|---|
| Feed | 0.10 | 94.89 | 0.28 | 4.73 | | |
| Permeate | 0.10 | 97.58 | 0.28 | 2.04 | 34.7 | 57 |

As shown in Table 3, the membrane exhibited favorable rejection of non-aromatics at favorable process conditions and permeate flow rates.

Example 6

A viscous solution containing 24% Lenzing P84 HT polyimide (HP Polymers, Inc., Lewisville, Tex.), 38% dioxane, and 38% dimethylformamide (DMF) was prepared. This solution was cast at 4 ft/min onto a moving web of nonwoven polyester fabric (Hollytex 3329) using a knife blade set at a gap of 7 mil above the fabric. After about 3 seconds with an air flow of 10 SCFH the coated fabric was quenched in water at 21° C. to form the membrane structure. The membrane was washed with water to remove residual solvents, then solvent exchanged by immersion into MEK for 1 hour, followed by immersion in a solution of 33% light neutral lube oil/33% MEK/33% toluene for 1 hour. The membrane was then air dried.

Coupons were tested with a 230–270° C. distillation cut of light cycle oil containing a high percentage of aromatic compounds. The percentage of 1-ring, 2-ring, and 3-ring aromatics and non-aromatic compounds were determined with supercritical fluid chromatography methods. Results from coupon tests at 1000 psi and 57° C. are reported in Table 4.

TABLE 4

Rejection and Flux for Lenzing P84 HT Membrane

| | Flux (GFD) | Non-aromatics (%) | 1-ring aromatics (%) | 2-ring aromatics (%) | 3-ring aromatics (%) | Non-aromatics rejection (%) |
|---|---|---|---|---|---|---|
| Feed | | 16.2 | 10.3 | 73.5 | 0.0 | |
| Permeate | 1.1 | 8.5 | 8.1 | 83.4 | 0.0 | 47 |

Example 7

A viscous solution containing 22% Lenzing P84 polyimide, 11% acetone, and 67% N-methyl-2-pyrrolidone (NMP) was prepared. This solution was cast at 4 ft/min onto a moving web of non-woven polyester fabric (Hollytex 3329) using a knife blade set at a gap of 7 mil above the fabric. After about 3 seconds the coated fabric was quenched in water at 22° C. to form the membrane structure. The membrane was washed with water to remove residual solvents, then solvent exchanged by immersion into MEK for 1 hour, followed by immersion in a solution of 40% light neutral lube oil/30% MEK/30% toluene for 1 hour. The membrane was then air dried.

A feed solution was obtained from a refinery and consisted of three components, 11% p-xylene, 15% 1-methylnaphthalene, and 74% of a light neutral lube distillate. Coupons were tested at 600 psi and 107° C. The lube distillate component of the feed was fractionated by refining processes into an aromatic-rich extract oil fraction and a non-aromatic-rich raffinate oil fraction. Analysis of the feed and permeate solutions and the refinery extract and raffinate fractions were performed with GC and UV/visible spectrometry. By monitoring the absorption at 350 nm in methylene chloride, an estimate of the percentage of aromatic-rich extract oil was determined. Results are recorded in Table 5 below.

TABLE 5

Fractionation of Lube Distillate Oil with Lenzing P84 Membrane

| | Flux (GFD) | p-xylene (%) | 1-methyl-naphtha-lene (%) | lube distil-late (%) | est. % extract oil in lube distillate | est. % raffinate oil in lube distillate |
|---|---|---|---|---|---|---|
| Feed | | 11.0 | 14.8 | 74.2 | 43.7 | 56.3 |
| Permeate | 4.1 | 12.9 | 17.4 | 69.7 | 49.8 | 50.2 | as shown in table 5, the membrane showed good rejection of non-aromatics as indicated by the increased aromatic content in the permeate.

What is claimed is:

1. Membrane having sufficient flux and selectivity to separate aromatic hydrocarbons from non-aromatic hydrocarbons in a feed stream under hlyperfiltration conditions comprising asymmetric polyimide membrane impregnated with at least one conditioning agent comprising a lubricating oil, wherein the polyimide is at least one copolymer derived from (a) the co-condensation of benzophenonie 3,3',4,4'-tetracarboxylic acid dianhydride and a mixture of (i) di(4-aminophenyl) methane and toluene diamine, or (ii) a mixture of 4,4'-methylenebis (phenyl isocyanate) and toluene diisocyanate; or (b) the condensation of 1H,3H-Benzo[1,2-c:4,5-c']difuran-1,3,5,7-tetrone with 5,5'-carbonybis[1,3-isobenzofuiranidione], 1,3-diisocyanato-2-methiylbenzene and 2,4-diisocyanato-1-miethylbenzene.

2. The membrane of claim 1 wherein the polyimide is a polyimide copolymer comprising from 10 to 90% of

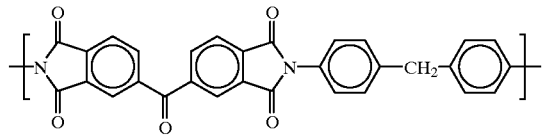

and from 10 to 90% of

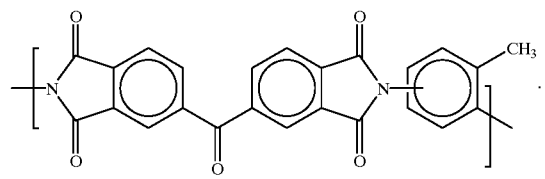

3. The polyimide membrane of claim 2 wherein the polyimide copolymer employed comprises about 20% of

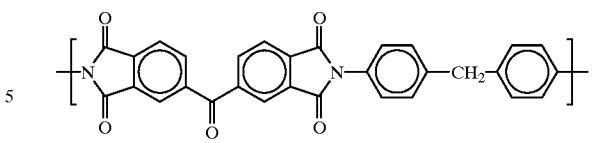

and about 80% of

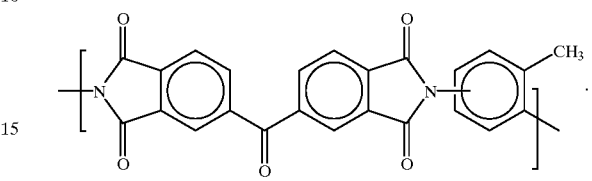

4. The membrane of claim 2 wherein the lubricating oil is a synthetic oil.

5. The membrane of claim 4 wherein the synthetic oil is a silicone oil, a polyolefinic oil, a polyalphaolefinic oil, a polyisobutylene oil, a synthetic wax isomerate oil, an ester oil or an alkyl aromatic oil.

6. The membrane of claim 2 wherein the lubricating oil is a mineral oil.

7. The membrane of claim 6 wherein the mineral oil is a solvent refined mineral oil, a petroleum wax isomerate oil or a hydroprocessed mineral oil.

8. The membrane of claim 1 wherein the lubricating oil is a synthetic oil.

9. The membrane of claim 8 wherein the synthetic oil is a silicone oil, a polyolefinic oil, a polyalphaolefinic oil, a polyisobutylene oil, a synthetic wax isomerate oil, an ester oil or an alkyl aromatic oil.

10. The membrane of claim 1 wherein the lubricating oil is a mineral oil.

11. The membrane of claim 10 wherein the mineral oil is a solvent refined mineral oil, a petroleum wax isomerate oil or a hydroprocessed mineral oil.

12. The membrane of claim 1 wherein the membrane is supported on a porous support material.

13. The membrane of claim 12 wherein the support material is a non-woven material.

14. The membrane of claim 13 wherein the non-woven material is a polyester, polyethylene or polypropylene material.

15. The membrane of claim 1 wherein the polyimide is a copolymer derived from the condensation of 1H,3H-Benzo[1,2-c:4,5-c']difuran-1,3,5,7-tetrone with 5,5'-carbonylbis[1,3-isobenzofurandione], 1,3-diisocyanato-2-methylbenzene and 2,4-diisocyanato-1-methylbenzene.

16. The membrane of claim 15 wherein the lubricating oil is a synthetic oil.

17. The membrane of claim 16 wherein the synthetic oil is a silicone oil, a polyolefinic oil, a polyalphaolefinic oil, a polyisobutylene oil, a synthetic wax isomerate oil, an ester oil or an alkyl aromatic oil.

18. The membrane of claim 15 wherein the lubricating oil is a mineral oil.

19. The membrane of claim 18 wherein the mineral oil is a solvent refined mineral oil, a petroleum wax isomerate oil or a hydroprocessed mineral oil.

20. A process for preparing a polyimide asymmetric membrane for the permselective separation of aromatic hydrocarbons from non-aromatic hydrocarbons under hyperfiltration conditions comprising (a) preparing a polyimide dope solution comprising a polyimide co-polymer derived from (1) the co-condensation of benzophenone 3,3',4,4'-tetracarboxylic acid dianhydride (BTDA) and a mixture of di(4 aminophenyl) methane and toluene diamine or a mixture of 4,4'methylenebis(phenyl isocyanate) and toluene diisocyanate; or (2) the co-condensation of 1H,3H-Benzo[1,2-c:4,5-c']difuran-1,3,5,7-tetrone with 5,5'-carbonylbis[1,3-isobenzofurandione], 1,3-diisocyanato-2-methylbenzene and 2,4-diisocyanato-1-methylbenzene, dissolved in a water miscible solvent in amounts of 20 to 28 by weight of said dope solution;

(b) casting said polyimide dope solution onto a porous support substrate to form a film;

(c) partially evaporating the solvent from the film;

(d) immersing the film obtained from step (c) into a coagulating medium to form an membrane; and (e) contacting the membrane with at least one wash bath containing a conditioning agent comprising a lubricating oil.

21. The process of claim 20 further comprising as step (f) drying the conditioned membrane of step (e).

22. The process of claim 21, wherein after step (f), optionally heating the membrane at 150° C. or higher for up to 2 hours.

23. The process of claim 20 wherein the water-miscible solvent used to prepare the polyimide dope solution is selected from the group consisting of N-methyl-2-pyrrolidone, tetrahydrofuran, N,N-dimethylformamide, dioxane, γ-butyrolactone, water, alcohols, ketones, formamide, and mixtures thereof.

24. The process of claim 20 wherein the polymer dope solution further comprises a viscosity enhancer in amounts of less than 10% by weight of said dope solution, said viscosity enhancer consisting essentially of polyvinyl pyrrolidones, polyethylene glycols or urethanes.

25. The process of claim 20 wherein the polymer dope solution further comprises a void suppresser in amounts of less than 5% by weight of said dope solution.

26. The process of claim 25 wherein the void suppresser consist essentially of maleic acid.

27. The process of claim 20 wherein the coagulating medium consist essentially of water, alcohol, ketones or mixtures thereof.

28. The process of claim 20 wherein the porous support substrate in step (b) is non-woven polyester, polypropylene or polyethylene.

29. The process of claim 20 wherein the conditioning agent in step (e) is a synthetic oil.

30. The process of claim 29 wherein the synthetic oil is silicone oil, a polyolefinic oil, a polyalphaolefinic oil, polyisobutylene oil, a synthetic wax isomerate oil, an ester oil or an alkyl aromatic oil.

31. The process of claim 20 wherein the conditioning agent is a mineral oil.

32. The process of claim 31 wherein the mineral oil is a solvent refined mineral oil, a petroleum wax isomerate oil or a hydroprocessed mineral oil.

* * * * *